Feb. 11, 1958 J. ROSCHEN 2,823,175

SEMICONDUCTIVE DEVICES

Filed Nov. 14, 1956

INVENTOR.
JOHN ROSCHEN
BY Carl H. [signature]
AGENT

United States Patent Office 2,823,175

Patented Feb. 11, 1958

2,823,175

SEMICONDUCTIVE DEVICES

John Roschen, Hatboro, Pa., assignor to Philco Corporation, Philadelphia, Pa., a corporation of Pennsylvania Application November 14, 1956, Serial No. 622,209

3 Claims. (Cl. 204—15)

This invention relates to semiconductive devices and more particularly to an improved method for fabricating plated semiconductive bodies. The method is particularly characterized in that the relative configurations of plated and unplated portions of such bodies may be controlled with great accuracy.

In the fabrication of semiconductive devices, such as transistors, which include a semiconductive body and a plurality of electrodes affixed thereto, it is often highly desirable to plate the transistor base portion with a highly conductive metal, without permitting the plating to extend to within a predetermined distance of either the emitter or collector elements thereof. Due to the fact that such devices are usually of very small size it will be understood that the mentioned distance is minute, and that control thereof necessarily presents substantial problems.

Such plating of the base portions of the transistor serves to reduce the series base-lead resistance of the transistor, which in turn improves the high frequency performance and reduces the degree to which signals applied to the base electrode are attenuated. The amplitudes of feedback signals which are developed across the base-lead resistance are also reduced by such plating, thereby decreasing the overall input resistance of the transistor.

As aforementioned, it is important that the metal plating overlying the base portion of the transistor shall not extend into contact with, or within a predetermined very small distance of, either the emitter or the collector element, inasmuch as such extension will, in the first case, short-circuit the contacted element to the base electrode, thereby rendering the transistor completely inoperative, or in the second case, greatly impede the normal operation of the emitter or collector. Accordingly, in order to fabricate a transistor device plated to within a predetermined small distance of the electrodes, the art has resorted heretofore to such expedients as masking each of the electrodes, as well as small regions surrounding each electrode, with a suitable nonconductive material such as lacquer. Owing to the smallness of a transistor and the closeness with which the plating should desirably approach the emitter and collector electrodes, the application of lacquer thereto is a tedious, time consuming, and often imprecise operation, ill-suited to mass-production techniques. Moreover, even after the lacquer has been applied and the transistor plated, there may remain the task of removing the lacquer from the surfaces of the transistor, with the correlative danger that the surface of the transistor may be physically or chemically altered in a manner which is injurious to the operating characteristics of the transistor.

It is therefore a broad objective of this invention to provide an inexpensive and operationally simple electrolytic method for producing a semiconductive body.

An additional object of the invention is to provide a novel method for providing transistor base connections, the method not requiring masking of portions of the transistor.

In achievement of the foregoing and other objectives this invention contemplates, in preferred practice, a novel method for providing a semiconductive body having a low base-lead resistance, through the simple expedient of plating the body, including attached base, collector and emitter electrodes, with a highly conductive material that adheres poorly, in a substantially porous layer, to the aforesaid collector and emitter electrodes, followed by immersing the body in a suitable etching solution substantially inert as respects the plating material but effective to undermine the aforesaid porous plating and remove at least a portion of the collector and emitter electrode elements, including their overlying plating, thereby exposing the electrode elements and creating a well defined small gap between these electrode elements and the remaining plating material which overlies the semiconductive body. It is a feature of this invention that the width of this gap may readily be controlled by varying either the nature of the etchant material or duration of application thereof, or both. Still another feature lies in the provision of the aforementioned gap configuration by etching without resort to masking means.

The manner in which the foregoing and other objects and advantages of the invention may best be achieved will be understood from a consideration of the following detailed description taken together with the accompanying drawing in which.

Figures 1, 2, 3:
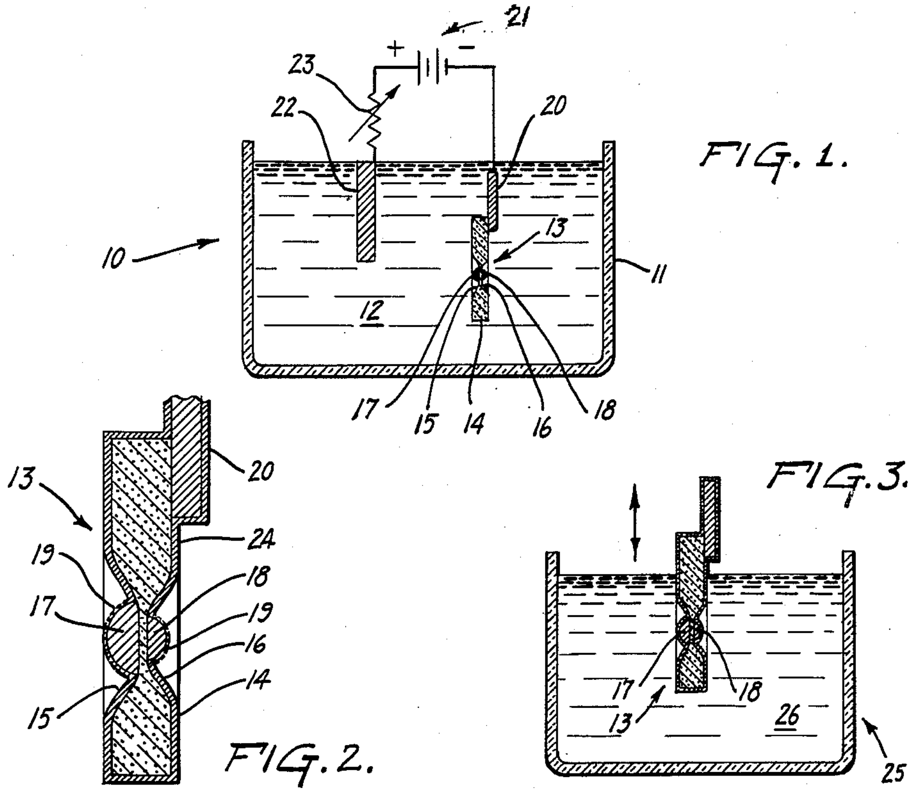
Figure 1 is a somewhat diagrammatic view of electroplating apparatus suitable for use in practicing the invention and including a sectional showing of a transistor.
Figure 2 is a sectional view, on a somewhat enlarged scale, of the transistor shown in Figure 1, after the electroplating operation.
Figure 3 is a somewhat diagrammatic view of apparatus suitable for chemically etching portions of the transistor shown in Figure 2.

Now turning to Figure 1 of the drawing there is shown an electroplating arrangement 10 for electroplating a semiconductive body. More specifically there is shown vessel 11 which may be made of an inert electrically insulating material, such as glass. The vessel contains metal-plating solution 12 which, in the present embodiment, is a gold-plating solution comprising preferably a solution of the following, in the amounts indicated:

| | | |
|---|---|---|
| KAuCN | gms | 4 |
| $K_2CO_3$ | gms | 8 |
| KCN | gms | 4 |
| $H_2O$ | cc | 500 |

Immersed in the solution is semiconductive structure 13 which, in the specific embodiment of this invention, is a surface-barrier transistor.

Transistor 13 comprises a rectangular body 14 of germanium having co-axial depressions 15 and 16 formed on opposing surfaces thereof. In these respective depressions, there have been plated a surface-barrier collector electrode 17 and a surface-barrier emitter electrode 18, each of which may be formed of indium and suitably adapted for attachment to connecting lead wires (not shown). Nickel base tab 20 has been soldered to one end of the semiconductive body, by means of a solder (not shown) composed principally of tin, which has been found to make a substantially ohmic contact. To energize the electroplating process, there is provided a source of direct voltage 21, and in accordance with the invention, the negative pole of the source is connected directly to the base tab 20 of the transistor, and the positive pole of the source is connected to an electrode 22 of inert material, preferably graphite, immersed in the plating solution. There is also disposed in series circuitry with voltage source 21 and inert electrode 22 a variable resistor 23. By applying a suitable potential difference, a current of 1 milliampere was attained which, when allowed to flow for 7 seconds, was found to accommodate plating of the desired layer of gold 24 (Figure 2) upon the germanium wafer 14 and base tab 20, and at the same time effect plating of generally porous layer 19 upon each of the electrodes 17 and 18. With respect to the latter, it has been found that, due to the nature of the indium electrodes, the gold plating is poorly adherent thereto, and is formed as a porous layer upon the surface of the indium. Alternatively, the aforementioned lead wires (not shown) may also be connected to the negative terminal of the voltage source, if it has been elected to attach these wires prior to the electroplating process.

There is shown in Figure 3 a transistor 13 gold plated as illustrated in Figure 2, and immersed in a bath 25 of a suitable etchant 26, for example a solution comprising, in a preferred practice of the invention, hydrochloric acid. As will be hereinafter more fully understood, immersion of the transistor is for a period of time suitable for obtaining the desired electrode configuration. Prior to the etching operation, however, and following completion of the electroplating operation the gold plated transistor 13, as shown in Figure 2, may be rinsed in any convenient manner with distilled water in order to insure removal of any gold plating solution adhering thereto.

Figure 5:
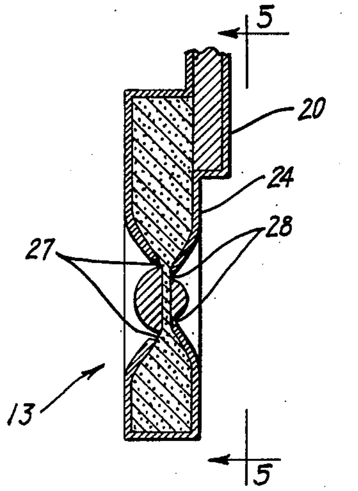
Figure 5 is an elevational view looking generally in the direction 5—5 of Figure 4, and further illustrating a transistor and an electrode-bearing surface thereof made in accordance with the invention.
Figure 4:
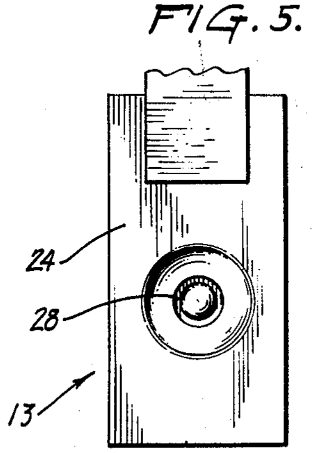
Figure 4 is a sectional view similar to Figure 2, and illustrative of the transistor following the etching operation of Figure 3.

In accordance with the invention, action of the etchant upon the gold portions 24 (Figures 4 and 5) is ineffective to remove the same; however it is seen that due to the porosity of the gold layer portions 19 adhering to electrodes 17 and 18 that etchant 26 undermines the layer 19 thereby etching exposed underlying portions of the aforesaid electrodes, and removing the overlying plating along with the electrode material. In further accordance with the invention, removal of the electrode material is advantageously such as to reduce the diameters of the same whereby the germanium, underlying peripheral portions of the electrodes, is exposed, and the desired narrow separations 27 and 28 between the gold plating and the electrodes is ensured. The width of these separations may be readily controlled by maintaining immersion in the etchant for a predetermined suitable period of time. Following establishment of the narrow separations, or annular rings, it is desirable, in normal transistor fabrication, to subject the exposed germanium to a clean-up etch to improve certain electrical characteristics of the transistor device, for example, those dependent upon surface leakage and surface recombination velocity.

From the foregoing it is seen that a simple and effective method has been provided to obtain a well defined annular ring, or band, of exposed germanium encircling the electrode and separating the same from the noble-metal coated surfaces of a transistor device, and without need for resort to masking means.

Although preferred practice of the invention, as presented for purposes of illustration, calls for a plating of gold to be applied to a germanium base, it is to be understood that other materials characterized by poor adherence with respect to the electrode material, for example platinum, may be utilized in place of the gold. Additionally, modifications may be made in the base material; for example silicon may be used in place of the aforesaid germanium. It is to be understood, also, that the surface barrier transistor is shown for illustrative purposes only, it being contemplated that the novel method may be carried out upon other elements having other suitable configurations, for example junction transistors as well as germanium diodes.

I claim:

1. In a method for fabricating a semiconductive structure including a semiconductive body having a body-contacting metallic electrode, the steps comprising: plating said semiconductive body and said electrode with a layer of metal which adheres firmly to said body but is loosely adherent to said electrode and porous in the region thereof; and etching the porous loosely adherent part of said plated layer, together with portions of the underlying electrode, to remove the stated porous part of said plated layer and a surface layer of the electrode, exposing an unplated zone of said semiconductive body between said electrode and remaining portions of said plated layer.

2. In a method for fabricating a transistor including a semiconductive body having a body-contacting indium electrode, the steps comprising: plating said semiconductive body and said indium electrode with a layer of gold which adheres firmly to said body but is loosely adherent to said indium electrode and porous in the region thereof; utilizing the porosity of that portion of the gold layer which overlies the electrode to introduce etchant into contact with the electrode, whereby to remove a surface layer of the electrode together with that part of the gold layer which overlies said electrode, exposing an unplated zone of said semiconductive body between said indium electrode and remaining portions of the gold layer.

3. In a method for fabricating a semiconductive structure including a semiconductive body having a body contacting indium electrode, the steps comprising: plating said semiconductive body and said indium electrode with a layer of gold; and etching said plated layer of gold, together with portions of the underlying indium electrode, to remove said plated layer overlying the electrode and a surface layer of the latter, exposing an unplated zone of said semiconductive body between said indium electrode and remaining portions of said plated layer of gold.

References Cited in the file of this patent

UNITED STATES PATENTS

| | | |
|---|---|---|
| 2,644,852 | Dunlap | July 7, 1953 |
| 2,757,323 | Jordan et al. | July 31, 1956 |